United States Patent [19]

Nagashima et al.

[11] Patent Number: 5,268,886
[45] Date of Patent: Dec. 7, 1993

[54] METHOD AND APPARATUS FOR REPRODUCING SIGNALS USING AN OPTICAL DISK HAVING V-SHAPED GROOVES

[75] Inventors: Michiyoshi Nagashima, Ikoma; Fumiaki Ueno, Hirakata; Toshinori Kishi, Osaka, all of Japan

[73] Assignee: Matsushita Electric Industrial Co., Ltd., Osaka, Japan

[21] Appl. No.: 734,543

[22] Filed: Jul. 23, 1991

[30] Foreign Application Priority Data

| Jul. 24, 1990 | [JP] | Japan | 2-196608 |
| Aug. 3, 1990 | [JP] | Japan | 2-207427 |
| Nov. 19, 1990 | [JP] | Japan | 2-313505 |

[51] Int. Cl.$^5$ .............................................. G11B 7/12
[52] U.S. Cl. ................................................ 369/44.41
[58] Field of Search ............... 369/32, 44.26, 44.41, 369/44.42, 120, 109

[56] References Cited

U.S. PATENT DOCUMENTS

| 4,310,916 | 1/1982 | Dil . | |
| 4,534,021 | 8/1985 | Smith . | |
| 4,569,038 | 2/1986 | Nagashima et al. . | |
| 4,674,070 | 6/1987 | Tajima et al. | 369/44.41 |

FOREIGN PATENT DOCUMENTS 0246597 11/1987 European Pat. Off. .
0301792 1/1989 European Pat. Off. .

Primary Examiner—Donald E. McElheny, Jr.
Attorney, Agent, or Firm—Ratner & Prestia

[57] ABSTRACT

A reproducing method for the V-shape groove optical disk is disclosed in which three laser beams are irradiated on a disk, and the reflected laser beams are focused on three light receiving units through object lens. The laser beams irradiated on two light receiving units are used for reproducing signal. Each of the two light receiving units has a light receiving segment which receives a portion of the reflected light beam which is greater than a half of the total reflected light so that a quality of the reproduced signal is improved.

7 Claims, 9 Drawing Sheets

METHOD AND APPARATUS FOR REPRODUCING SIGNALS USING AN OPTICAL DISK HAVING V-SHAPED GROOVES

BACKGROUND OF THE INVENTION

1. Field of the Invention

The present invention relates to an optical disk reproducing method for an optical disk employing the V-shaped groove system and also to an optical disk reproducing apparatus employing a light detecting apparatus particularly designed therefore.

2. Description of the Prior Art

To increase the density of data recorded in optical disks, the V-shaped groove system has been proposed which is disclosed, for instance, in U.S. Pat. Nos. 4,310,916 (corresponding to Japanese Patent Laid-open Publication No. SHO 56-58144), 4,569,038 (corresponding to Japanese Patent Laid-open Publication No. SHO 57-105828) and 4,534,021 (corresponding to Japanese Patent Laid-open Publication No. SHO 58-102339).

Figure 1:
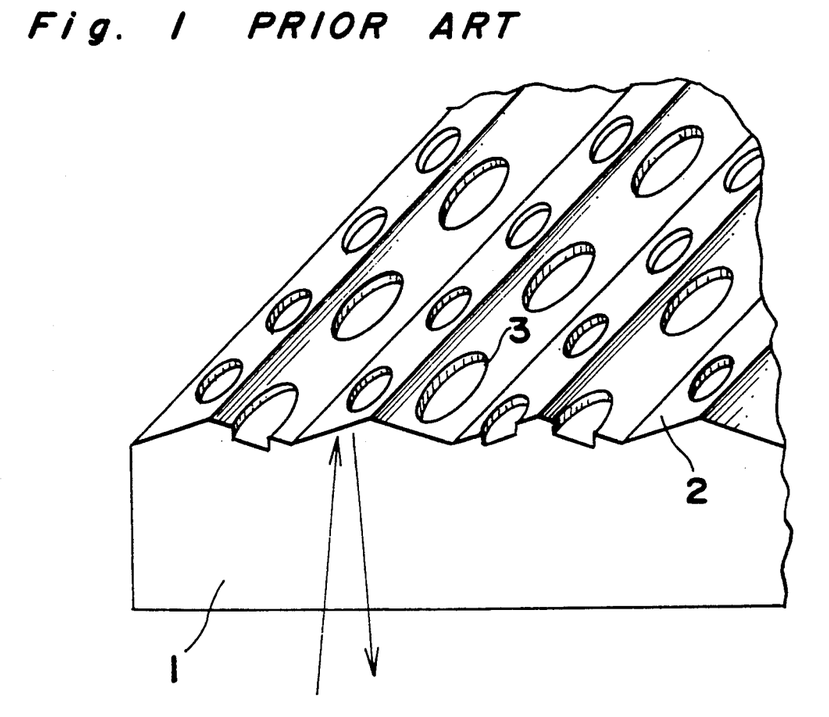
FIG. 1 an enlarged perspective sectional view of a V-shaped optical disk.

FIG. 1 is an enlarged perspective view of a replica section of a V-shaped groove disk, which includes a transparent substrate 1, V-shaped grooves 2, and signal pits 3 formed on the slopes thereof. The laser for reproducing signals is irradiated from the bottom side of the transparent substrate 1, as shown by an arrow, and reflected to the side of the transparent substrate 1 by a reflection film (not shown) formed on the surface of the v-shaped grooves of the substrate 1.

Figure 2:
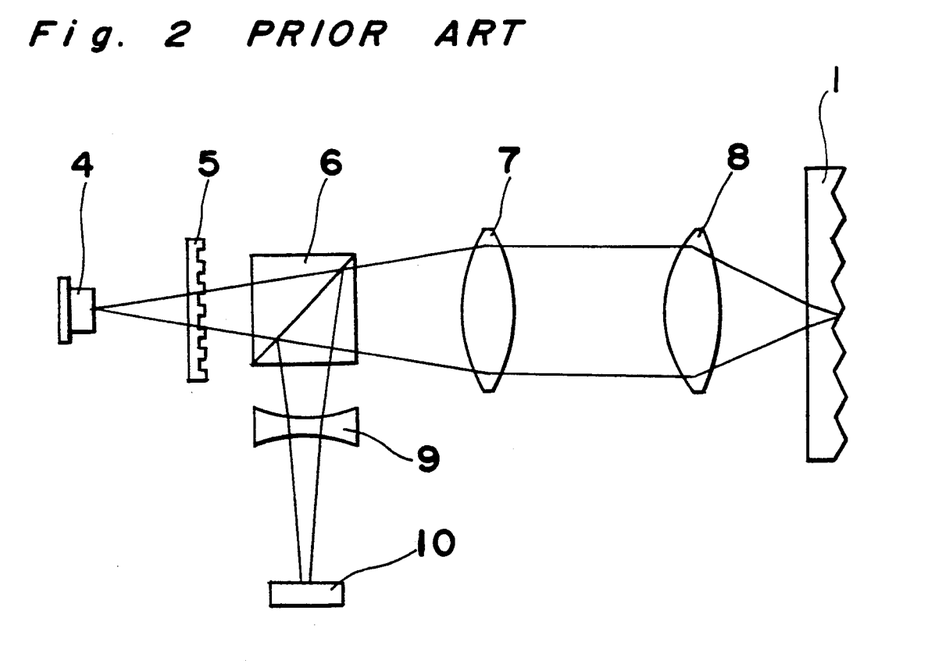
FIG. 2 is a schematic view showing a reproduction optical system for the V-shaped optical disk according to the prior art.

The optical system for signal reproducing will be briefly described with reference to Fig. 2. The light from a semiconductor laser 4 passes through a diffraction grating 5, and a half mirror 6, collimated by a collimating lens 7, and focused on the V-grooved disk by an object lens 8. The light reflected from the disk passes again through the object lens 8 and the collimator lens 7, and after reflection by the half mirror 6, ixradiated onto a light detector 10, with astigmatism being given by a cylindrical lens 9, such as a biconcave cylindrical lens. In Fig. 2, the axis of the cylindrical lens g is parallel to the V-shaped grooves (perpendicular to the paper face). Based on the signal obtained from the light detector 10 by the irxadiation of reflected light, the position control of the laser spot on the disk and the reproduction of the recorded signal are effected.

Figure 3:
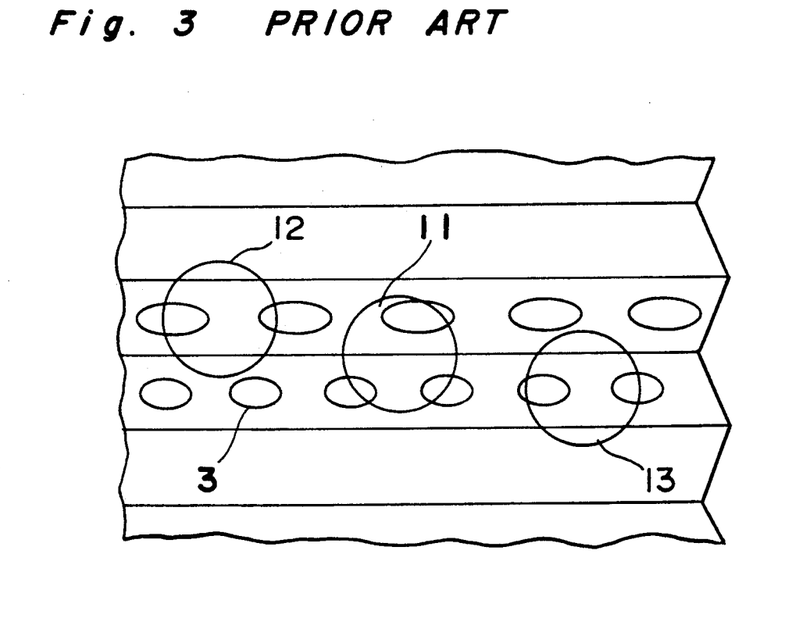
FIG. 3 a schematic drawing showing the arrangement of laser spots on the V-shaped optical disk.

Furthermore, the laser beam of the semiconductor laser is practically split into three bundles of beams by the diffraction of the diffraction grating 5 so as to form 3 spots on the v-shaped disk as shown in Fig. 3. In the reproduction optical system of Fig. 2, only one beam of the three beam is shown for simplicity of the drawing.

Among the three spots on the disk shown in Fig. 3, the middle spot 11 is focused onto the xidge or valley of the V-shaped groove so as to effect the focusing control and tracking control, while the spots 12 and 13 of the +1st order and −1st order diffraction light are focused onto the adjacent slopes of the V-shaped groove for the signal reproduction. Since the two signals on the slope can be independently reproduced, the transfer rate becomes twice.

Figure 4:
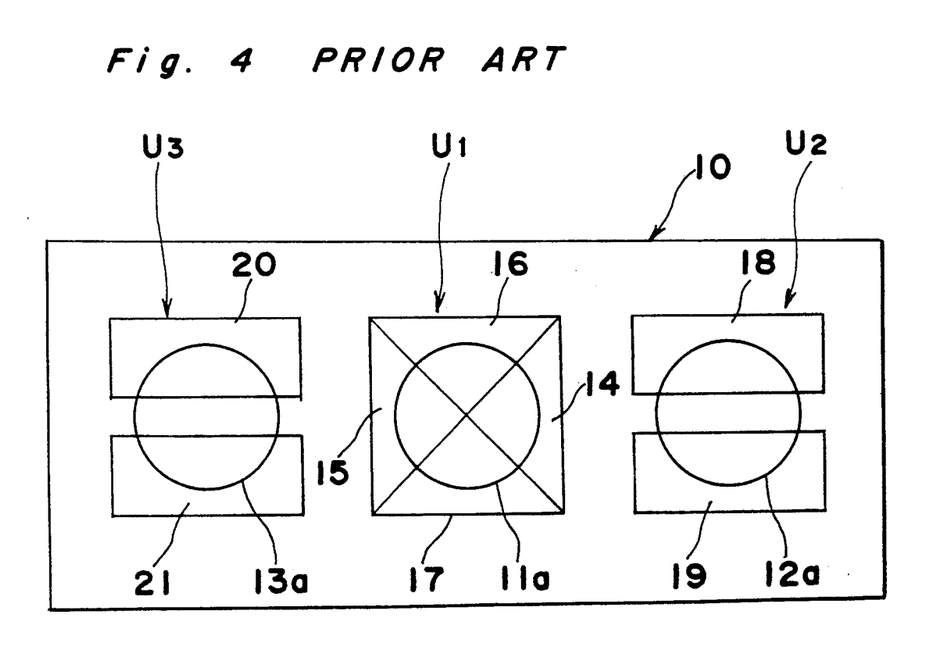
FIG. 4 is a schematic drawing showing the constitution of the light detection segments of a light detector for the V-shaped groove optical disk according to the prior art.

The light detector 10 includes three detection units U1, U2 and U3, as shown in Fig. 4, at locations corresponding to three laser spots formed on the light detector 10. Each of the three detection units is divided into two or more segments. The dividing of the unit into a number of segments is disclosed, for example, in Japanese Patent Laid-open Publication SHO 60-212836 in which it is disclosed that the three units U1, U2 and U3 are divided into 8 segments, such as shown by 14 to 21 in FIG. 4.

The three bundles of beams reflected from the V-shaped groove impinge on the light detector 10 as shown in FIG. 4. Since the axis of the cylindrical lens 9 is parallel to the V-shaped groove, a line dividing between the detection segments 18 and 19 or a line dividing between the detection segments 20 and 21 coincides with the direction parallel to the V-shaped groove. The spot position control is effected by the reflection beam 11a, while the focusing control of astigmatism system is effected by the signal obtained by subtracting the sum signal of the detection segments 16 and 17 from the sum signal of the detection segments 14 and 15. The tracking control of push-pull system is effected by the signal obtained by subtracting the signal of the detection segment 17 from that of the detection segment 16. The signals on the adjacent slopes can be reproduced by reflection beams 12a and 13a. For the signal reproduction, the ccmbination of detection segments 19 and 20 is used, and the siqnal on one slope is reproduced by the detection segment 19, the signal on the confronting slope is reproduced by the detection segment 20. In same optical systems, the combination of the detection segments 18 and 21 is used for the signal reproduction.

The construction of the reproduction optical system in FIG. 2 is general for the reproduction of the optical disk, and used or not only the V-shape disk but also for the conventional flat plate disk such as CD and video disk. However, the division of detection segments of the light detector and roles of respective detection segments are different.

Figure 5:
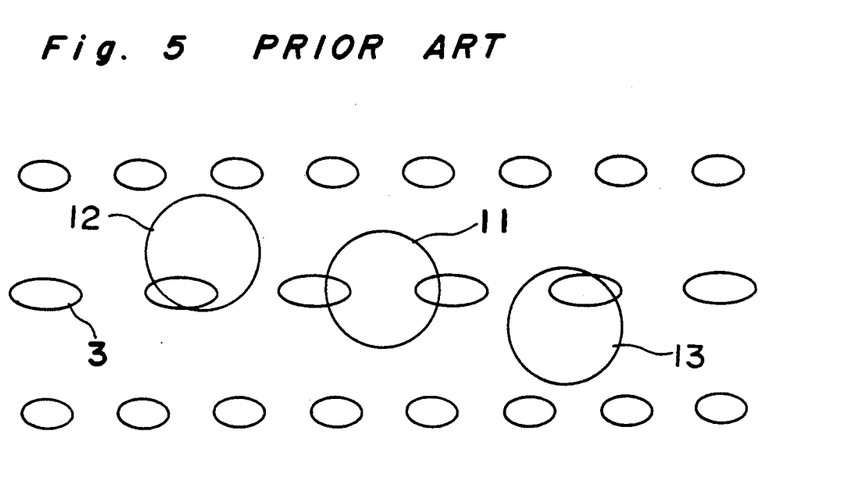
FIG. 5 is a schematic drawing showing the arrangement of laser spots on the prior art flat plate disk.
Figure 6:
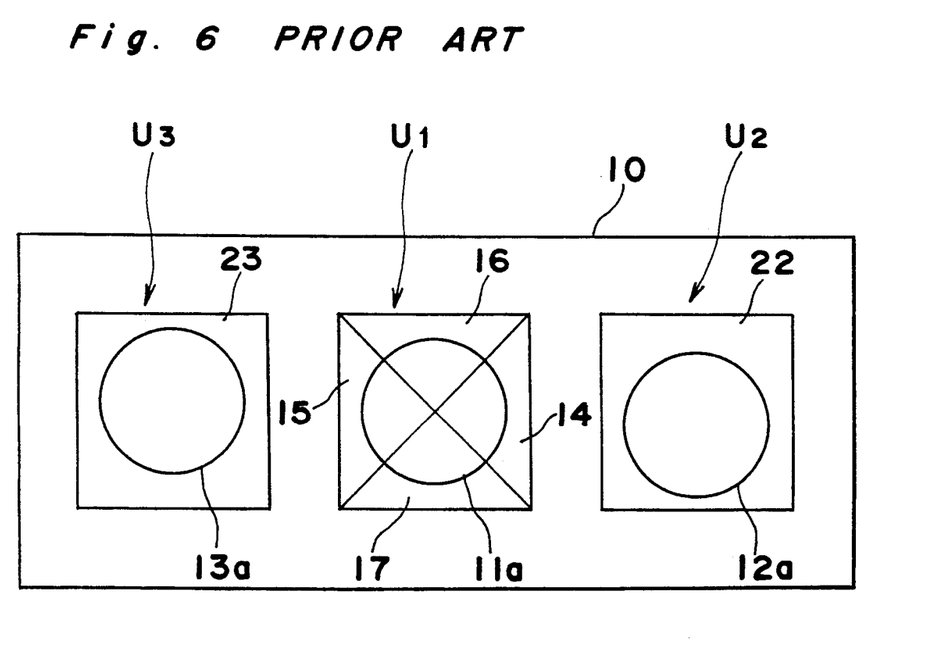
Fig. 6 is a schematic constitution drawing for the light detection segments of the prior art light detector for the flat plate disk.

In the conventional flat plate disk, although three spots 11 to 13 are arranged as shown in FIG. 5, a light detector 10 as shown in Fig. 6 is used for the reproduction of the flat plate disk. The detection segments 18 and 19 in FIG. 4 are integrated as the detection segment 22, while the detection segments 20 and 21 are also integrated here as the detection segment 23, thus constituting a light detector divided into 6 portions on the whole.

FIG. 6 shows three reflection beams from the disk. The focuslng control of the spot position and the signal reproduction are effected by the reflection beam 11a, while the focus control of astigmatism system is effected by the signal obtained by subtracting the sum signal of the detection segments 16 and 17 from the sum signal of the detection segments 14 and 15, and the signal reproduction is effected by the sum signal of the detection segments 14, 15, 16 and 17. Furthermore, light reflected respectively from 12a and 13a are irradiated onto the detectlon segments 22 and 23, and by comparing the received light amount thereof, the tracking control of three beam system is effected. Thus, the reproduction in the case of the flat plate disk is conducted.

Now, in the v-shaped groove system, for raising the record density, it is desired to decrease the track pitch (center line distance between adjacent slopes) by narrowing the distance between v-shaped groove ridges. Even at this time, it is necessary to reduce the leakage signal (cross-talk) between adjacent slopes, and to this end, there have been proposed several reproduction methods for the V-shaped disk. The typical three methods therefor will be described below.

First, in U.S. Pat. No.4,310,916, it is proposed to irradiate laser beam onto the slope perpendicularly thereto, and all of the reflected light is received. In an object lens of more than 0.5 high NA (numerical aperture), the incident angle of laser beam is to be set within 1 to 2 degree to the normal of the optical axis of the object lens and to the normal of the surface of the disk substrate (transparent substrate 1 in FIG. 1), and with a larger incident angle, aberration will take place and thereby the laser beam can not be sufficiently focused, resulting in the deterioration of the reproduced signal quality. In this conventional example, the slope angle of the V-shaped groove slope is more than 5 degree at the smallest, and therefore, the incident angle of laser beam relative to the surface of the transparent substrate in FIG. 1 exceeds the allowable range, and it is very difficult to put the conventional method into practical use.

Secondly, the reproduction method proposed by U.S. Pat. No. 4,569,038 will be described. This method is arranged to make laser beam incident upon the disk approximately parallel to the optical axis of the object lens and also approximately parallel to the normal line of the surface of the transparent substrate 1 of FIG. 1, thereby capable of focusing the laser spot on the V-shaped groove with small aberration. Here, the term "approximately parallel" means that the angle between two lines is within one degree. Since the V-shaped groove slope is inclined, the direction of the reflected light departs from the optical axis of the object lens. Since, on the reproducing slope of the V-shaped groove, the center of the laser spot is tracked, most of the light is irradiated onto the reproducing slope, and most of the reflected light returns also onto a semicircular or a half-circular portion of the object lens. Furthermore, although the reflected light from the adjacent slope returns also onto the opposing half-circular portion of the object lens, since only the peripheral portion of the laser spot is irradiated on the adjacent slope, the reflected light amount is small.

Figure 7A:
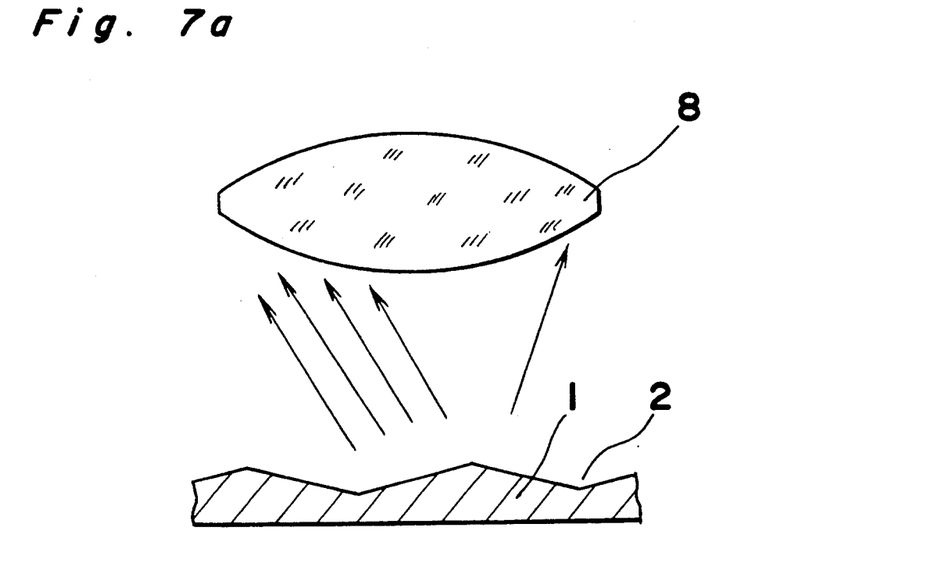
FIG. 7a is a diagrammatic view of an optical arrangement showing reflected light beams from the V-shaped groove slopes.
Figure 7B:
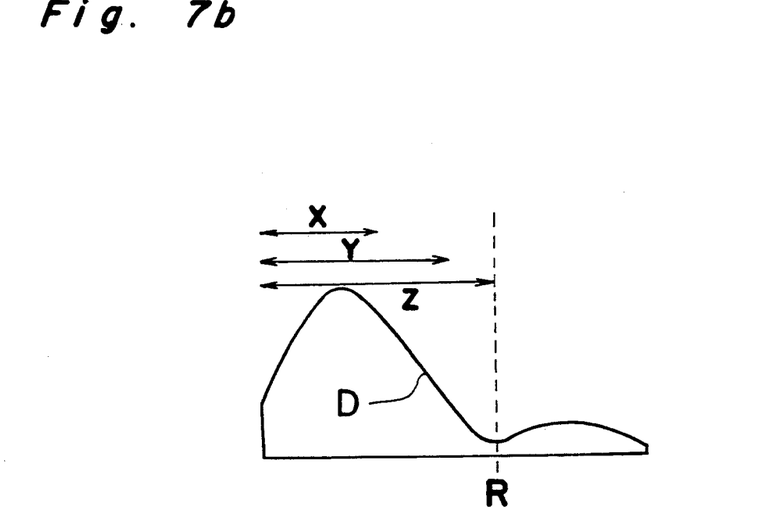
FIG. 7b is a graph showing a reflected light distribution by the optical arrangement shown in Fig. 7(A)

More specifically, the reflected light from the laser spot on the slope of V-shaped groove 2 is directed mostly toward the semicircular portion of the object lens 8, as shown in Fig. 7a, so that the distribution of the reflected light becomes such a curve D as shown in Fig. 7b. This reflected light distribution D is an example in which laser beam is irradiated onto a position where no signal pit is present on the slope, and divided into a reflected light portion of large intensity and a reflected light portion of small intensity. This larger reflected light portion corresponds to the reflected light from the reproducing slope, spreading to more than half of the object lens.

When there is a signal pit on the reproducing slope, respective mountain portions in the distribution D in Fig. 7b are decreased, with the decreased amount being spread on the periphery, which is not shown in FIG. 7b. Further more, when there is a signal pit on the adjacent slope, the smaller mountain portion in the distribution D in FIG. 7b is decreased, with the decreased amount being spread onto the periphery, so as to constitute the leakage signal (cross-talk) from the adjacent slope.

Although the reflected light distribution D in FIG. 7b is reduced in its beam diameter by the lens system in the reflection path, the spot pattern irradiated on the light detector 10 will have a distribution similar to that shown in the FIG. 7b. In U.S. Pat. No. 4,569,038, it is analyzed that the cross-talk of the reproduced signal can be reduced by the interference effect of the reflected light at a region X which is smaller than a half-circular portion. The light detector used for reproducing data obtained at such region X can be accomplished by inserting a non-sensitive segment between detection segments 18 and 19 and between detection segments 20 and 21 in FIG. 4, as is proposed by Japanese Patent Laid-Open Publication No. SHO 60-212836.

The above is the outline of the disclosures in U.S. Pat. No. 4,569,038 and Japanese Patent Laid-open Publication SHO 60-212836.

Thirdly, in the method proposed by U.S. Pat. No. 4,534,021, laser beam is also made incident in parallel to the optical axis of the object lens, and most of the reflected light is condensed onto a half portion of the lens. In this patent, although the reflected light passing through the object lens and other reflected light from outside the object lens are received, with respect to the reflected light passing the object lens, the reflected light passing through the half-circular portion is received, such as shown by region Y in FIG. 7b. Thus, it may be possible that the cross-talk can be made small to some extent, but it is not to an optimum level.

In the analysis of the above conventional examples, an assumption that laser light is always in complete coherence is included.

When no signal pit is form on the slope, and a thin film of phase change material is formed on the surface of the V-shape groove and only the reflectivity of the recording portion is changed by the signal record, there is no surface ruggedness on the slope and the assumption of coherence is realized to some extent, and the analysis result may explain the actual experimental result. Furthexmore, the same will apply in the case where a film of photo-magnetic material is formed on the V-shape groove surface, and the magnetization direction is changed by the signal record.

However, in the case of a reproducing disk where a signal pit is formed on the V-shaped groove slope, since it is difficult to form a signal pit on the disk in an ideal shape, and the bottom surface and the periphery may be somewhat disturbed, the reflected light is not a completely coherent light, with the actual phenomenon being considerably different from those shown in the above conventional examples. Therefore, in the above conventional examples, it is impossible to effect an optimum signal reproduction.

For example, many components disturbed by the scattering are included in the reflected light, and coherence is partially broken, resulting in reduction of the interference capability. Scattered light has no specific directionality, and these cross-talk components arising from the scattering are spread over the entire reflected light so as to be included almost homogeneously. Therefore, the tendency that the cross-talk becomes a minimum at a particular portion of the reflected light is reduced, and in the case of receiving only one portion of the reflected light distribution, the reproduced signal does not become a maximum, and it is disadvantageous for obtaining a signal of high quality.

Therefore, as an actual problem, it is necessary to provide an optimum reproducing method for the V-shaped groove disk which is formed with signal pits on the slope thereof.

SUMMARY OF THE INVENTION

The present invention has been developed with a view to substantially solving the above described disadvantages and has for its essential object to provide an improved method for an optical disk and a light detector to be used therefor.

In order to achieve the aforementioned objective, according to the present invention, there is provided a method which is arranged to make laser beam incident approximately parallel to the optical axis of an object lens and to receive, among the reflected light from a V-shaped disk, the reflected light passing through more than a half-circular portion of the object lens.

Since the incident direction of the laser beam is approximately parallel to the optical axis of the object lens, the aberration of the laser spot focused onto the V-shaped groove disk can be made small.

Since the V-shaped gxoove is inclined, the direction of the reflected light therefrom is deviated from the optical axis of the object lens. The reflected light distribution from the disk surface is divided into a larger reflected light portion from the reproducing slope and a smaller reflected light portion from the slope adjacent to the reproducing slope. The larger reflected light portion corresponding to the reflected light from the reproducing slope spreads to more than half of the object lens. Receiving more than a half-circular portion of the object lens among the reflected light from the V-shaped groove slope leads to receiving almost all of the portion corresponding to the reflected light rom the reproducing slope, and thus, the reproduction signal can be made close to the maximum. In this case, since the cross-talk components tend, to a high extent, to be homogeneously included in the entire reflected light, the ratio of the cross-talk to the size of the reproduced signal is decreased relatively, and, the quality of the reproduced signal can be improved.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

Figure 8:
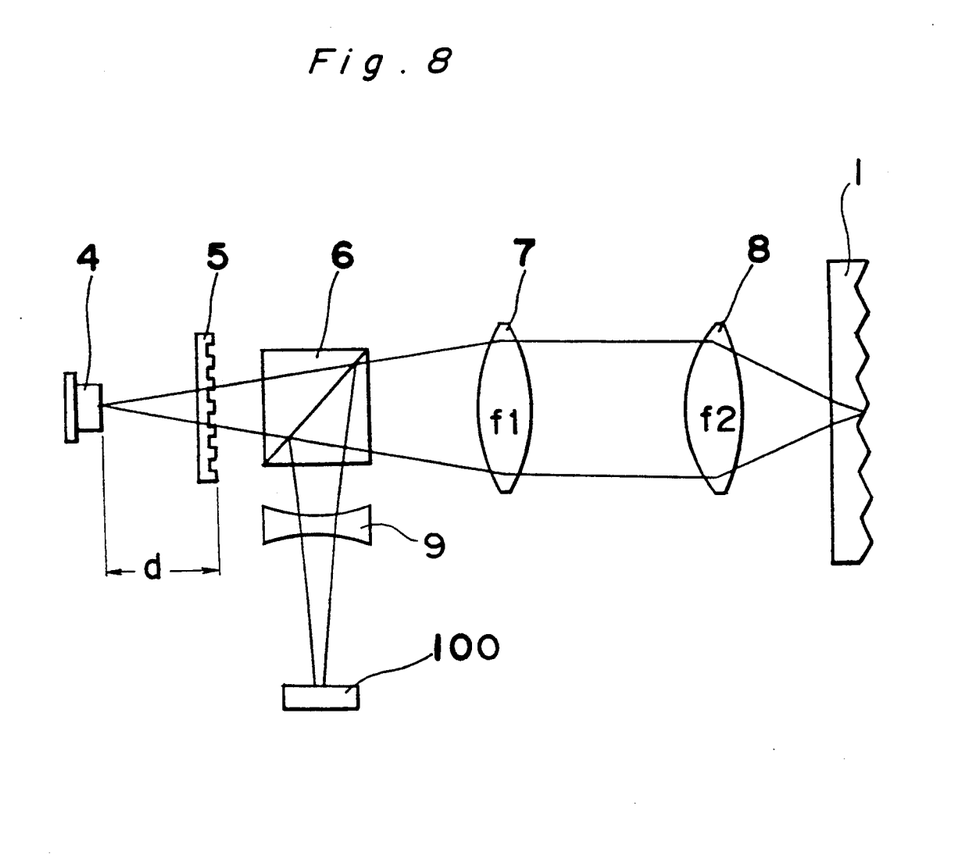
FIG. 8 is a schematic view showing a reproduction optical system according to a first preferred embodiment of the present invention.

Referring to FIG. 8, a reproduction optical system according to a first embodiment of the present invention is shown. A light from a semiconductor laser 4 passes through a diffraction grating 5 at which the light beam is divided into three hundles of light by the diffraction. The three bundles of beam are transmitted through a half mirror 6 and are collimated by a collimating lens 7 and focused on the V-grooved disk by an object lens 8. Thus, the three bundles of beam form three spots, such as 11, 12 and 13 shown in FIG. 3 on the V-grooved disk.

The middle spot 11 is focused on the ridge or valley of the V-shaped groove so as to effect the focusing control and tracking control, while the spots 12 and 13 formed by the +1st order and −1st order diffraction light are focused onto the adjacent slopes of the V-shaped groove for the signal reproduction. Since the two signals on the slope can be independently reproduced, the transfer rate becomes twice.

The three bundles of beam reflected from the disk passes again through the object lens 8 and the collimator lens 7, and are reflected by the half mirror 6 so as to irradiate on a light detector 100 through a cylindrical lens 9, such as a biconcave cylindrical lens, at which astigamatism is given. Based on the signal obtained from the light detector 100, the position control of the laser spots 11, 12 and 13 on the disk and the reproduction of the recorded signal are effected in a known manner.

Figure 9:
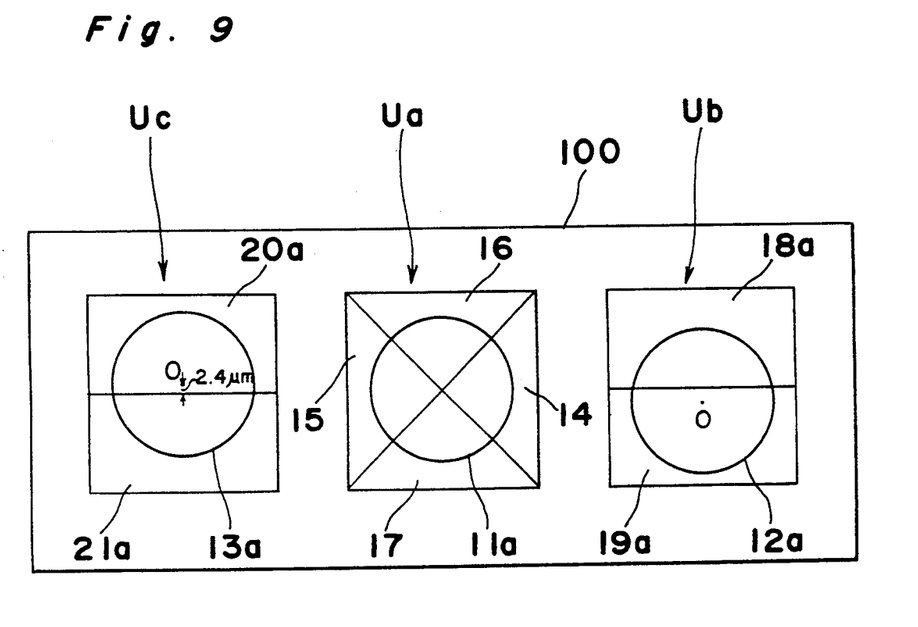
Fig. 9 a top plan view of a light detector employed in the optical system of FIG. 8.

The light detector 100 according to the present invention includes three detectlon units Ua, Ub and Uc, as shown in FIG. 9, at locations corresponding to three laser spots formed on the light detector 100. The first detection unit Ua located at the centor has a square configuration and is divided into four triangle detection segments 14, 15, 16 and 17 separated along diagonal lines thereof. The second detection unit Ub located on the right of the first unit Ua has a square configuration and is divided into two equal segments 18a and 19a along a center line extending in a direction parallel to the direction of the V-shaped groove image which may be formed on the light detector 100. There is no substantial separating segment inserted between the segments 18a and 19a. The third detection unit Uc located on the left of the first unit Ua has the same arrangement as the second unit Ub, and is divided into two equal segment 20a and 21a. Each segment is formed by a photoelectric element capable of generating an electric signal relative to the amount of light irradiated on the segment.

According to the present invention, a relative position of the light detector 100 with respect to the optical system for producing the reflected light spots 11a, 12a and 13a is such that the center of spot 11a coincides with the center of the first unit Ua, the center of spot 12a is located in the lower segment 19a of the second unit Ub, and the center of spot 13a is located in the upper segment 20a of the third unit Uc.

In FIG. 8, the wave length of the semiconductor laser 4 is represented by λ, the distance between its light emitting point and the diffraction grating 6 is represented by d, the focal length of the collimator lens 7 is represented by f1, and the focal length of the object lens 8 is represented by f2. When the pitch of the diffraction grating is represented by p, three bundles of light beams caused by the 0 order, +1st order and −1st order laser light harmonics after passing the diffraction grating are emitted from apparent emitting points which are spaced by a distance of $$A = \frac{\lambda}{p} \times d$$

and are focused onto the disk respectively in spots which are spaced by a distance of $$B = \frac{f2}{f1} \times A.$$

The three bundles of laser light beam reflected from the disk are separately reflect on the half mirror 6, and are focused on light detector 100. Although the reflected beams shape are changed by the astigmatism, the light detector 100 is located at a position where these beams are separately focused in three circles 11a, 12a and 13a, as shown in FIG. 9. Since respective diameters of the reflected light beams on the light detector 100 are small, the positions become close to the focal length position of the collimator lens 7. Each center distance of the three spots on the light detector 100 is approximately (f1/f2) times of the spot distance measured on the disk. Thus, from the above equation, the distance between the neighboring spots on the light detector 100 is approximately A.

In the first preferred embodiment shown in FIGS. 8 and 9, the values of respective optical components are as follows.
λ=0.67 μm,
d=5 mm,
p=50 μm,
f1=24 mm,
f2=4 mm
Then, A and B become as follows.
A=67 μm,
B=11 μm Thus, the center distance between the neighboring spots on the light detector 100 is approximately 67 μm.

In FIG. 3, since the pitch of the V-shaped groove on the disk surface is 1.6 μm, that is, the track pitch of the signal is 0.8 μm, a distance between laser spots 11 and 12 or between laser spots 11 and 13 in the radial direction of the disk is 0.4 μm. When this distance 0.4 μm is multiplied by f1/f2, the result, which is 2.4 μm, is approximately equal to a distance between laser spots 11a and 12a or between laser spots 11a and 13a in the radial direction of the disk as measured on the light detector 100.

The light detection units Ub and Uc for receiving +1st order and −1st order diffraction lights are divided into two symmetrical and equal size segments, 18a and 19a, and 20a and 21a. Since the axis of the cylindrical lens 9 is parallel to the image of the V-shaped groove passing therethrough, the images of the reflected beams are not rotated on the light detector 100, the line dividing the detection segments 18a and 19a and the line dividing the detection segments 20a and 21a are parallel to the V-shaped groove. Therefore, the centers of the +1st order and −1st order diffraction lights are deviated about 2.4 μm from the division lines of the detection segments on the light detector. According to the present invention, detection segment 19a in unit Ub, and the detection segment 20a in unit Uc are used for the signal reproduction, so that the light passing through a portion slightly larger than the half-circular portion of the object lens is detected.

The spot position control, the focusing control and the tracking control of push-pull system are effected by the same manner described above in connection with FIG. 4.

The signals on the adjacent slopes can be reproduced by reflection beams 12a and 13a. For the signal reproduction, a combination of detection segments 19a and 20a is used, and the signal on one slope is reproduced by the detection segment 19a, the signal on the confronting slope is reproduced by the detection segment 20a.

According to the present invention, since the segment which receives more than half of the spot light is used for reproducing the signal, it is possible to reduce the cross-talk, eventually increasing the quality of the reproduced signal. This is further explained below in connection with an experiment carried out by the present inventors.

A V-shaped groove disk formed with signal pits on the slopes thereof was actually reproduced and the signal quality (C/N and cross-talk) was measured to examine the optimum light receiving portion for the reflected light. The experiment conditions are described below.

A disk having signal pits of 0.6 μm length formed periodically (1.2 μm pitch) on one slope and signal pits of 0.8 μm length formed periodically (1.6 μm pitch) on the opposing slope is used to obtain signals of about 8 MHz and 6 MHz, respectively, from the two opposing slopes when the disk is rotated at a linear velocity of about 10 m/sec.

The disk is obtained by laminating a metallic reflection film on a replica obtained from the stamper which is made from the master disc.

Figure 7C:
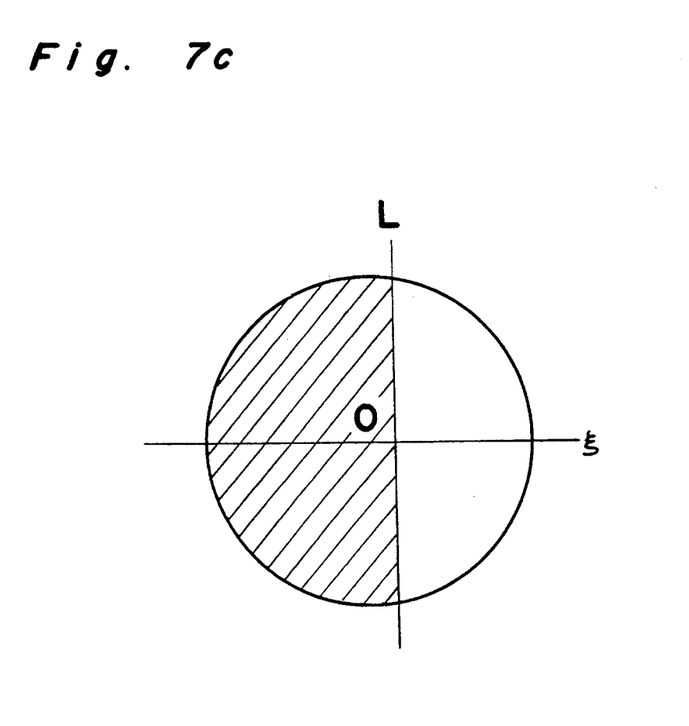
Fig. 7c is a diagram showing a shaded area at which the data is picked up by a light detector of the present invention.

When the signal of 8 MHz is reproduced, signal of 6 MHz on the adjacent slope is also mixed therewith. The circle in FIG. 7c shows the reflected light and corresponds to 12a or 13a in FIG. 9. As discussed above in connection with FIGS. 7a and 7b, the reflected light from the rightward rising slope of the disk where the most of the reflected light is concentrated is used for forming the left-hand half-circular portion (shaded portion) of the circle shown in FIG. 7c.

Figure 7D:
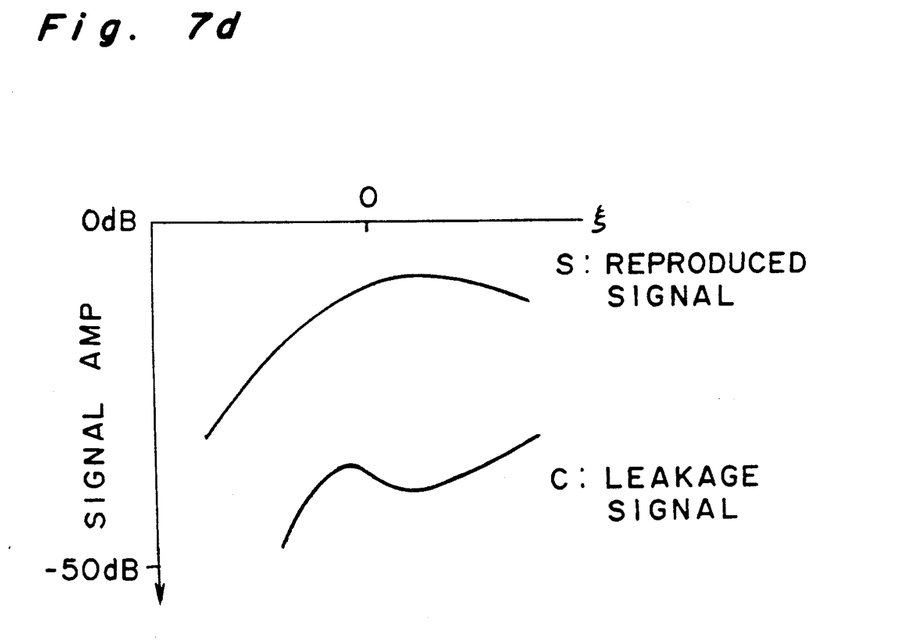
Fig. 7d is a graph showing a relationship between the reproduction region of the reflected light from the V-shaped groove disk and the signal quality.

In the experiment, the signal reproduction of the reflected light for the left-hand portion (shaded portion) of the vertical line L shown in FIG. 7c was effected. Using the abscissa ξ, through which the center O passes, and ordinate L as parameters, the reproduced signal S of 8 MHz and leakage signal C of 6 MHz are shown in FIG. 7d. The difference between signals of 8 MHz and 6 MHz becomes the cross-talk. The optimum light receiving zone in the conventional analysis was a reflected light portion a little smaller than the half-circular portion as indicated by an arrow X or Y in FIG. 7b.

However, in the experiment carried out by the present inventors, it is found that receiving a reflected light portion a little larger than the half-circular portion, such as Z shown in FIG. 7b, for the signal reproduction results in an increase in the signal reproduction amplitude and reduction of cross-talk. This zone Z corresponds to the receiving of almost all of the larger reflected light portion when the reflected light distribution D is divided into two portions at the most reduced or narrowed point R.

The reason why the analysis differs from the experimental result will be briefly described below. The conventional analysis included the assumption that the laser light is always in the complete coherence (interferential capability).

In the case where no signal pit is formed on the V-shaped groove slope and a phase change material is vapor deposited on the surface of V-shaped groove with only the reflectivity of the recording portion being changed by the signal recording, the assumption is correct to some extent, because there is no ruggedness disturbing the coherence on the V-shaped groove slope. To this extent, the analysis is in line with the actual experimental result.

However, in the case where signal pits are formed on the V-shaped groove slope as in a non-writable disk, many light beams disturbed by the scattering are included in the reflected light. Such scattering light beams are caused by irregular surface, such as at the bottom face and periphery face of the pits. Thus, the reflected light does not have any more the complete coherence. When the coherence is partially broken, it results in a degradation of the interferential capability. In addition, the cross-talk component by the scattering has no particular reflection direction, but rather included homogeneously in the reflection light. Therefore, the tendency that the cross-talk becomes the minimum at a particular portion of the reflected light is not any more supported. Thus, the receiving of only one portion, less than the half, of the reflected light distribution, would not result in the maximum amplitude of the reproduced signal.

As shown in FIG. 7b, the reflected light distribution D from the V-shaped groove slope is divided at point R into a larger portion corresponding to the reflected light from the reproducing slope, and a smaller portion corresponding to the reflected light from the slopes adjacent thereto. By receiving the light beams almost from the larger portion, the reproduced signal can be made the maximum. In this case, the cross-talk component highly tends to be included homogeneously all over the reflected light distribution, the ration of the cross-talk amount to the size of the reproduction signal is relatively reduced, and the quality of reproduction signal can be improved.

In other words, from the experiment, it is concluded that, in order to improve the quality of the reproduced signal, the detection segment 19a or 20a should receive light beams in the zone Z shown in FIG. 7b, which is more than a half-circular portion of the object lens among the reflected light passing through the object lens.

Figure 10:
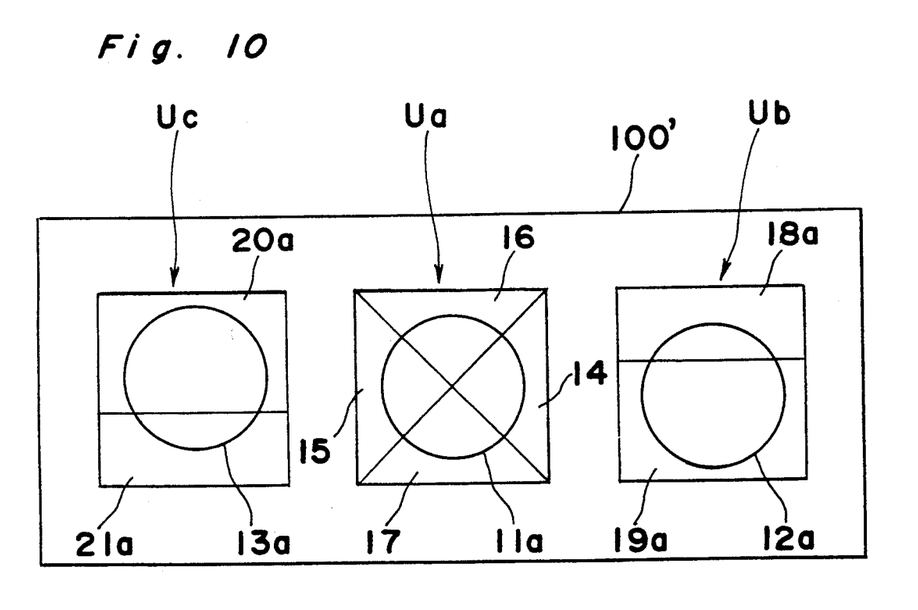
FIG. 10 is a view similar to FIG. 9, but particularly showing a modification thereof.

Referring to FIG. 10, a modification of the light detector 100' is shown. Each of the units Ub and Uc is divided asymmetrically such that the light detection segment 19a is greater than 18a, and the light detection segment 20a is greater than 21a, so as to detect greater percentage of the spots 12a and 13a irradiating on the units Ub and Uc, respectively. For reproducing the signals, the larger detection segments 19a and 20a are employed.

Second Embodiment

Figure 11:
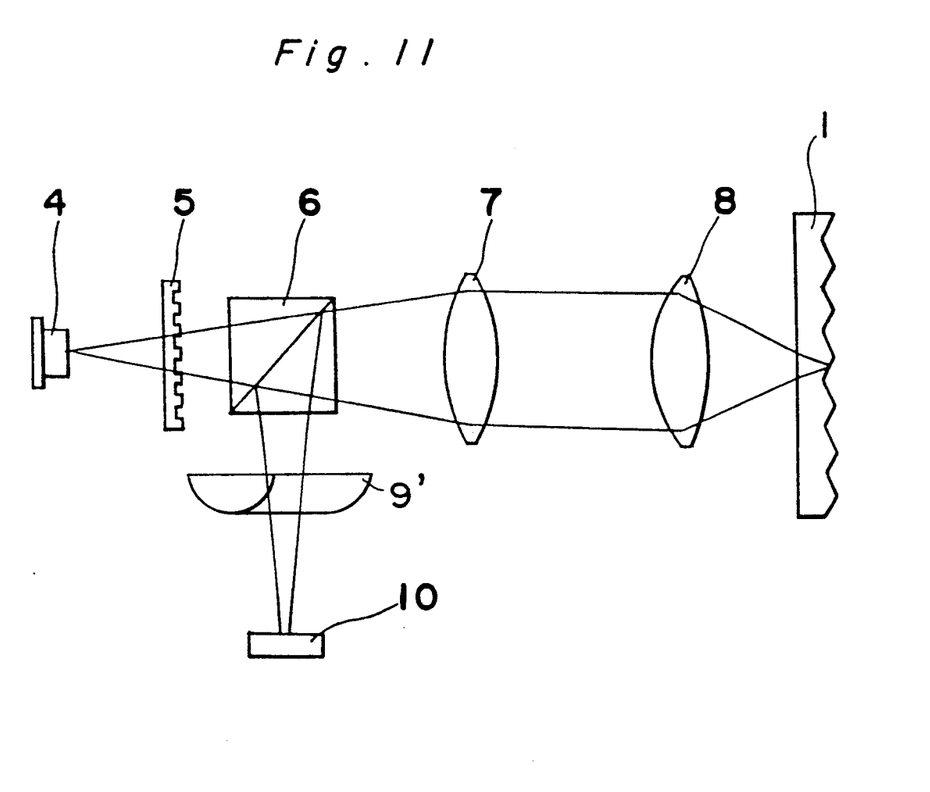
FIG. 11 is a schematic view showing a reproduction optical system according to a second preferred embodiment of the present invention.

Referring to FIG. 11, an optical system according to a second embodiment of the present invention is shown. When compared with the first embodiment shown in FIG. 8, the axis of the cylindrical lens 9', such as a semicircle cylindrical lens 9', is arranged so as to be inclined by 45° relative to the direction of the V-shaped groove. In FIG. 11 the relationship among λ, d, p, f1, f2, A and B are the same as in FIG. 8, and thus respective center distances of the three reflected beams on the light detector 102 is approximately equal to $A=(\lambda/p) \times d$.

Figure 12:
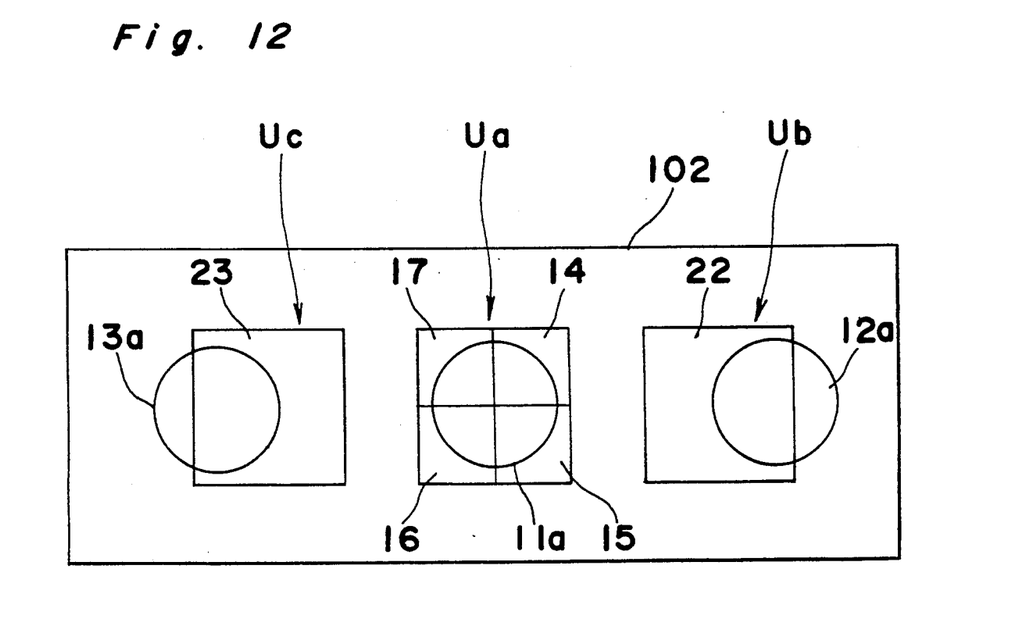
FIG. 12 is a top plan view of a light detector employed in the optical system of FIG. 11.

Furthermore, the light detector 102 for reproducing the signal according to the second embodiment is different from that of the first embodiment, and the detail of which is shown in FIG. 12. Since the astigmatism focus control is carried out in combination with the lens 9' which is inclined 45° relative to the direction of the V-shaped groove, the images of the three reflected beams are rotated 90° on the surface of the light detector 102 relatively to the three beam spots formed on the disk. Thus, the direction of the V-shaped groove imaged on the disk is parallel to the line dividing light receiving elements 14 and 17, or 15 and 16.

The first detection unit Ua located at the center has a square configuration and is divided into four small square detection segments 14, 15, 16 and 17 separated along the center lines thereof. The second detection unit Ub located on the right of the first unit Ua has a square configuration and is a plane square detector 22. Similarly, The third detection unit Uc located on the left of the first unit Ua is also a plane square detector 23.

In the second embodiment, the focus control is effected by the signals obtained from unit Ua in response to the receipt of the reflected beam 11a such that the sum signal of light receiving portions 15 and 17 is subtracted from the sum signal of light receiving portions 14 and 16. Furthermore, the tracking control on the mountain or valley of the v-shaped groove may be made with a push-pull type tracking signal obtained by subtracting the sum signal of light receiving portions 16 and 17 from the sum signal of light receiving portions 14 and 15.

In the optical system of the second preferred embodiment, the distance between the neighboring beam spots 11a and 12a or 11a and 13a on the light detector 102 is made greater than that in the first embodiment so that portions of the reflected beam spots 12a and 13a do not fall completely within the detection units Ub and Uc, respectively. By this arrangement, portions of the reflected light spots 12a and 13a are not incident on the detectors 22 and 23, respectively. In other words, not all but more than half of the reflected light passing through the object lens is incident on the respective detectors. Thus, the detectors 22 and 23 will reproduce the image signal in the optimum zone Z shown in FIG. 7b. Thus, the reproduced signal will have a high quality with less cross-talk.

The second embodiment can be easily realized by increasing the distance d between the emitting point of the semiconductor laser 4 and the diffraction grating 5 since the center distances of the reflected beams on the light detector 102 is proportional to such a distance d.

Furthermore, also by employing the reproduction optical system shown in FIG. 11 and the light detector shown in FIG. 12, it is possible to carry out the three beam tracking with respect to the conventional flat plate disk through comparison of the light amounts of the light receiving portions 22 and 23.

Figure 13:
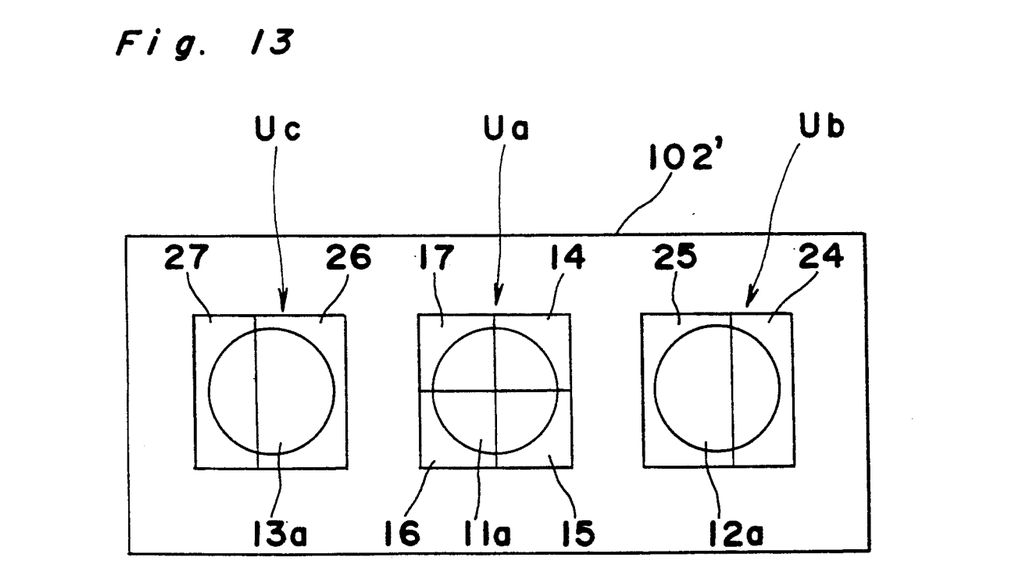
Fig. 13 is a view similar to FIG. 12, but particularly showing a modification thereof.

Referring to FIG. 13, a light detector 102' which is a modification of that shown in FIG. 12 is shown. The second and third units Ub and Uc for receiving the reflection beams 12a and 13a, respectively, are divided into two segments such that the second unit Ub has segments 24 and 25 divided along a line parallel to the line dividing the segments 14 and 17 with the segment 25 located close to the center unit Ua greater than the segment 24, and the third unit Uc has segments 26 and 27 divided along a line parallel to the line dividing the segments 14 and 17 with the segment 26 located close to the center unit Ua greater than the segment 27. The reflected beams are rotated 90° on the surface of the light detector 102 so as to receive not all but more than half of the reflected light passing through the object lens.

By employing the light detector 102' of FIG. 13, the same advantage as that obtained in the above described light detector 100 can be obtained. Thus, it is possible to reproduce a high quality signal through the adjustment of the distance d between the emitting point of the semiconductor laser 4 and the diffraction grating 5.

The light detector shown in FIG. 13 may be also used for reproducing the conventional flat plate disk, and in that case, a tracking signal of three beam system may be made by subtracting the sum signal of portions 26 and 27 from the sum signal of portions 24 and 25.

As described above, according to the present invention, since the laser beam is made incident approximately in parallel to the axis of the object lens, the aberration of the spot images on the disk may be made small. Furthermore, since the light receiving segment for reproducing the pit signal on the disk receives more than half-circular portion of the spot image from the object lens from the V-shaped groove slope, a reproduction signal of a high quality may be obtained.

Furthermore, as a useful light detector for this method, a light detector in which the light detection segments for receiving the reflected light from the V-shaped groove slope are respectively divided into two portions.

Furthermore, the reproduction of a high quality signal can be realized easily by adjusting the distance between the laser light source and the diffraction grating to such an amount that not all but more than half of the reflected light from the V-shaped groove slope passing through the object lens irradiates on the light receiving segment used for reproducing the signal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disk reproducing method for reproducing signals from a disk having grooves of a V-shaped cross-section with recording signal pits formed in the slopes of said V grooves, said optical disk reproducing method comprising the steps of:

irradiating a laser beam on said disk through an object lens in a direction approximately parallel to the axis of said object lens and approximately perpendicular to said disk; and receiving on a photoelectric segment a reflected light passing through more than half of the half-circular portion of said object lens.

2. An optical disk reproducing method as claimed in claim 1, wherein a portion less than half of the reflected light from said V-shaped groove slope is not irradiated on said photoelectric segment.

3. An optical disk reproducing method as claimed in claim 1, wherein said laser beam is radiated from a laser source through a diffraction grating for forming a plurality of spots on said disk and for receiving said reflected light on a plurality of photoelectric segments, and wherein a distance between said grating and said laser light source is adjusted so that a portion which is greater than a half of the reflected light from the V-shaped groove slope irradiates on each of said photoelectric segment for producing signal representing the pits.

4. An optical disk reproducing device for reproducing signals from a disk having grooves of a V-shaped cross-section with recording signal pits formed in the slopes of said V grooves, said optical disk reproducing device comprising:

means for producing a plurality of laser beams onto said disk;

object lens means inserted in a path of said laser beams;

a plurality of photoelectric segments for receiving, respectively, reflected laser beams from said disk and passing through said objective lens means, each said photoelectric segment receiving a portion which is greater than a half of the reflected light passing through said object lens means.

5. An optical disk reproducing device as claimed in claim 4, wherein each said photoelectric segment is formed by dividing a photoelectric element into two parts.

6. An optical disk reproducing device as claimed in claim 4, wherein said two parts are symmetric in size.

7. An optical disk reproducing device as claimed in claim 4, wherein said two parts are asymmetric in size.

* * * * *